United States Patent [19]

Tsuchie

[11] Patent Number: 4,766,772
[45] Date of Patent: Aug. 30, 1988

[54] HUB MECHANISM FOR SELF-PROPELLING TYPE LIGHT VEHICLE

[76] Inventor: Kimihiro Tsuchie, 35-1, Kinugasa Tenjimori-cho, Kita-ku, Kyoto-shi, Japan

[21] Appl. No.: 940,955

[22] Filed: Dec. 12, 1986

[30] Foreign Application Priority Data

Dec. 27, 1985 [JP] Japan .............................. 60-204110[U]

[51] Int. Cl.$^4$ .............................................. F16H 27/02
[52] U.S. Cl. ........................................ 74/126; 74/143; 280/255; 192/48.92
[58] Field of Search .......................... 74/142, 143, 126; 192/48.92; 280/246, 255, 258, 242 WC, 242 R

[56] References Cited

U.S. PATENT DOCUMENTS

| 390,174 | 9/1888 | Lambert | 280/246 |
|---|---|---|---|
| 532,143 | 1/1895 | Dailey | 74/143 |
| 1,349,588 | 8/1920 | Smith | 74/143 |
| 2,397,790 | 4/1946 | Kapusta | 74/143 |
| 2,630,333 | 3/1953 | Petersen | 280/255 |
| 3,994,509 | 11/1976 | Schaeffer | 280/244 X |
| 4,358,126 | 11/1982 | Mitchell et al. | 280/246 X |
| 4,421,336 | 12/1983 | Petrofsky et al. | 280/242 X |
| 4,453,729 | 6/1984 | Lucken | 280/244 X |
| 4,467,668 | 8/1984 | Tatch | 280/255 X |
| 4,503,724 | 3/1985 | Ward | 74/143 |
| 4,523,769 | 6/1985 | Glaser et al. | 74/143 X |
| 4,574,649 | 3/1986 | Seol | 280/255 X |
| 4,583,754 | 4/1986 | Seeliger | 280/246 |
| 4,630,839 | 12/1986 | Seol | 280/255 |

FOREIGN PATENT DOCUMENTS 2369960 7/1978 France ......................... 280/242 WC Primary Examiner—Gary L. Smith
Assistant Examiner—Rodney M. Lindsey
Attorney, Agent, or Firm—Koda and Androlia

[57] ABSTRACT

A hub mechanism according to this invention for the self-propelling type light vehicle is provided with: a hub shaft secured to the main body of the vehicle; a pair of right and left drivers rotatably carried by the hub shaft and rotatable in the directions for forward and backward movement of the vehicle when actuated by the driving force transmitted from a driving force generating part; a hub shell rotatably carried by the hub shaft; a pair of right and left one-way clutches for forward movement to transmit rotations of the drivers for forward movement to the hub shell and another pair of right and left one-way clutches for backward movement to transmit rotations of the drivers for backward movement to the hub shell; and releasing members for releasing the rotation-transmitting actions of the one-way clutches individually or collectively; in which the rotational directions of the hub shell are optional when the rotation-transmitting actions of the one-way clutches for forward and backward movements are individually released whereas the hub shell can be put in the free state by collective release of the above-mentioned actions.

3 Claims, 8 Drawing Sheets

HUB MECHANISM FOR SELF-PROPELLING TYPE LIGHT VEHICLE

BACKGROUND OF THE INVENTION

1. Field of the Invention

This invention relates to a hub mechanism suitable for the self-propelling type light vehicle, particularly, to the pedal-propelled type wheelchair and conveyor cart.

2. Description of the Prior Art

The wheelchair for the physically handicapped or the sick has been designed on the presumption that it is used solely by the person disabled in leg, and intended to be capable of moving when wheeled by the attendant on the user or when the main wheels thereof are turned by arms of the user him(her)self. Conventional wheelchairs, therefor, require no action of the user's leg even when used by the person whose legs remain sound to some degree, and deprive the user of opportunities of training to restore the function of legs thereof, thereby resulting in a cause to weaken user's legs further.

The physically handicapped and the sick using the wheelchair are not always sound in arm and, rather, not a few of them desire to use legs thereof remaining sound for driving the wheelchair.

The provision of a propelling mechanism employing pedals for the wheelchair may satisfy such desire as above, however, rotary type pedals generally used for the bicycle are not suitable for the disabled in leg and inferior to lever type ones alternately trodden right and left. Further, an improved wheelchair must be movable in not only forward but also backward direction and, at need, also movable when wheeled by the attendant or when the user rotates the main wheels thereof similarly to the conventional wheelchairs.

Some of light vehicles as conveyor carts widely used in small scale factories for conveying loads are of automatic propelling type equipped with a motor driven with the battery, however, followed by such problems as high cost and heavy weight. A light vehicle for the abovesaid use, if fabricated into pedal-driven type, may be inexpensive and light in weight but must be movable in the forward and backward directions and when subjected to wheeling by man power.

An ordinary type pedal-propelling mechanism widely used for the bicycle is not suitable for the above purposes because of the rotary type of pedal and simple function thereof adaptable to the forward movement only. None of mechanisms suitable for the above purposes in practical use have not yet been found.

SUMMARY OF THE INVENTION

This invention was initiated in view of such problems as above and an object thereof is to provide a hub mechanism suitable for fabricating a self-propelling type light vehicle low in cost and light in weight.

Another object of this invention is to provide a hub mechanism for the light vehicle equipped with a pair of lever type pedals disposed right and left and repeating reciprocal movement as a source of driving force, in which treading force exerted on one pedal is transmitted to the driving wheel independently of that on the other pedal through a pair of connecting members disposed right and left.

Still another object of this invention is to provide a hub mechanism particularly suitable for making a combination thereof with the pedal mechanism in which a pair of right and left pedals are interlocked to move in the directions opposite to each other.

For achieving the above objects, a hub mechanism of this invention for the self-propelling type light vehicle is provided with: a hub shaft secured to the main body of the vehicle; a pair of right and left drivers rotatably carried by the hub shaft and rotatable in the directions for forward and backward movements when actuated by the driving force transmitted from a driving force generating part; a hub shell rotatably carried by the hub shaft; a pair of right and left one-way clutches for forward movement to transmit rotations of the drivers for forward movement to the hub shell and another pair of right and left one-way clutches for backward movement to transmit rotations of the drivers for backward movement to the hub shell; and releasing members for releasing the rotation-transmitting actions of the one-way clutches individually or collectively.

In the hub mechanism of this invention, the hub shell is driven by the driving force transmitted from a driving force generating part which may comprise pedals or other driving means employing the motor or the like. The rotational directions of the hub shell are optional when the rotation-transmitting actions of the one-way clutches for forward movement and those for backward movement are individually released whereas, when the abovesaid actions are collectively released, the hub shell can be put in the free state.

In this way, self-propelling type light vehicles inexpensive and light in weight such as conveyor carts and wheelchairs driven by the mechanical power of the motor or with operation of pedals trodden by human legs can be obtained.

By providing a pair of right and left pedals to repeat reciprocal movement and adapting these pedals to move in the opposite directions while trodden alternately right and left, the driving force can be transmitted continuously and incessantly to the hub shell, thereby ensuring a pedal-propelled vehicle easy to operate thanks to its capability of moving with a small degree of treading force applied thereto and operability of clutches permitting option of forward movement, backward one, and free state of the vehicle. Thus, this invention makes it easy to obtain a wheelchair suitable for the daily use thereof by the handicapped person poor in leg power or the use in rehabilitation for restoring leg power and also to provide a conveyor cart movable rearwardly, too, and capable of small sharp turn or suitable for the use in the mine and a closed workshop to be protected from fire and exhaust, respectively.

With reference to the drawings, embodiments of this invention will be described.

BRIEF DESCRIPTION OF THE DRAWINGS

FIGS. 1 through 10 are views of a first embodiment of this invention, in which a wheelchair provided with a hub mechanism according to this invention is shown;

FIG. 2 is a broken plan view of the essential part thereof;

FIG. 3 is a plan view of a hub shaft;

FIGS. 4a through 6b are views for explaining the performance of the hub mechanism;

FIG. 7 is a side view of a wheelchair having a seat removed;

FIG. 8 is a plan view thereof;

FIG. 9 is a view showing the relation between a driving wheel and a pair of main wheels;

FIG. 10(a) is a side view of the pedal parts; -(b), a front view thereof; a -(c), a partially broken plan view taken along the line C—C in -(b);

FIG. 11 is a side view of the conveyor cart; and

FIG. 12 is a plan view thereof.

DETAILED DESCRIPTION OF THE PREFERRED EMBODIMENT

Figure 1A:
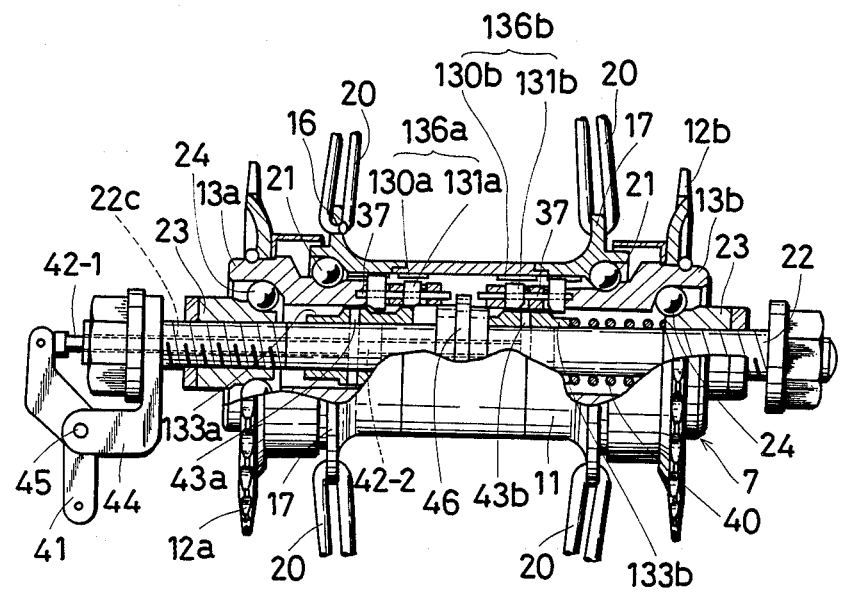
FIGS. 1(a) to 1(c) are partially broken plan views of a hub mechanism.

First, the entire structure of a mechanism of this invention will be described with reference to FIGS. 7 and 8.

In the drawings, the reference numeral 1 indicates the main frame; 2, hand-pushing part provided in the upper rear of the main frame 1; 3a, 3b, a pair of manually operated main wheels fixed to both rear sides of the main frame 1; and 4a, 4b, a pair of foot wheels fixed to both front sides of the main frame 1; a fundamental structure composed of such parts as above and being the same as that of the wheelchair generally used.

The numeral 5 denotes a driving mechanism for self-propelling disposed below the main frame 1 and provided with an auxiliary frame 6, hub part 7, pedal part 8, and chains 9a, 9b; and 10, a driving wheel fixed to the hub part 7. Every wheel is of, for example, spoke-equipped type, however, no spokes are shown in the drawings. The driving wheel 10 is disposed in the mid-position between the main wheels 3a, 3b so that a contact point 10' of the driving wheel 10 with the ground may lie on the line passing through contact points 3a', 3b' of the main wheels 3a, 3b, respectively, with the ground, however, may preferably lie just on the midpoint of a length L between contact points 3a', 3b'.

Free foot wheels 4a, 4b are in the known structure and supported at positions deviated from axes around which the wheels are steered, and one 4a of foot wheels having a steering handle 93 connected therewith acts as a steering wheel. The steering handle 93 is positioned in front of and higher than the main frame 1 so as to be easily operated by the user. Accordingly, with the steering handle 93 turned in an optional direction, the free foot wheel 4a turns to the same direction as above while rolling, guides the wheelchair along the same direction, and adapts the other free foot wheel 4b to follow likewise, thereby smooth steering of the wheelchair being performed.

FIGS. 1 through 6 are views of a hub part 7, that is, a hub mechanism embodying this invention, wherein the reference numeral 11 designates a hub shell; 12a, 12b, sprockets, and 13a, 13b, drivers.

The hub shell 11 is in the form of a cylinder having flanges 17, on which spoke holes 16 are bored, fixed to both outer ends thereof and is connected to the driving wheel 10 with spokes 20. The drivers 13a, 13b are inserted into the hub shell 11 from both ends and rotatably supported by bearing balls 21 disposed in spaces each formed between a bearing race on the outer end of the bore of the hub shell 11 and the counterpart on the mid-portion of one of the drivers 13a, 13b.

The drivers 13a, 13b are pierced through by the hub shaft 22 at centers thereof and rotatably supported by bearing balls 24 disposed in spaces each formed between the bearing race at one end of the bore of the driver and the counterpart on the ball pusher 23 screwed onto the hub shaft 22, the diametrally large parts of the drivers outwardly projecting beyond both ends of the hub shell 11 and having sprockets 12a, 12b fixed thereto. The hub shaft 22 is fixed to the auxiliary frame 6 with ordinary means similar to that used for the bicycle and the auxiliary frame 6 is appropriately fixed to the main frame 1.

Figure 4:
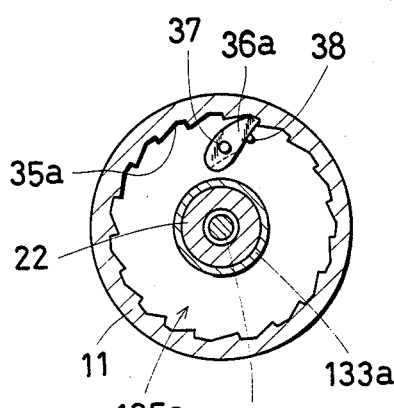
Figure 4:
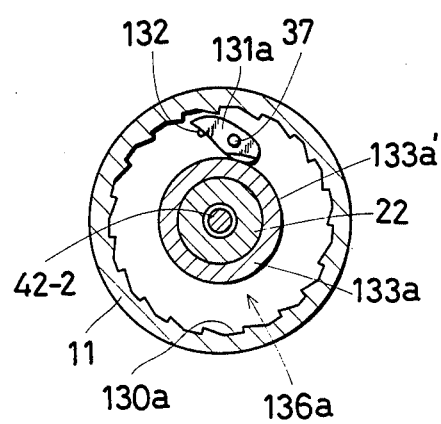
Figures 5A, 5B:
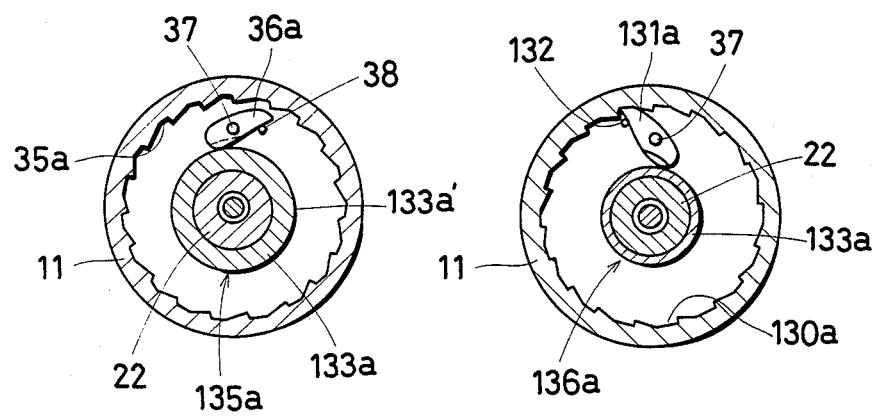
Figures 6A, 6B:
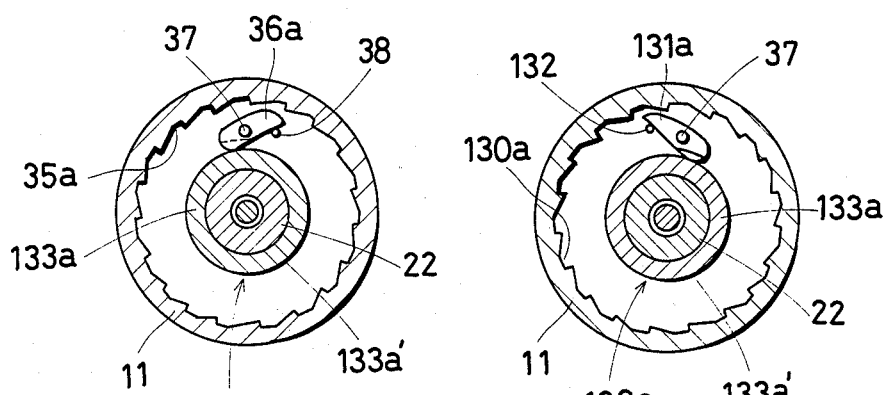

The reference numerals 35a, 35b designate ratchet parts for forward movement provided on both ends of the inner surface of the hub shell; 130a, 130b, ratchet parts for backward movement provided on the inner surface of the hub shell 11 and disposed in parallel with the ratchet parts 35a, 35b but adapted to move in the direction opposite to that of the ratchet parts 35a, 35b; 36a, 36b, ratchet pawls arranged in grooves formed on the drivers 13a, 13b, fixed to the drivers by means of pins 37, and adapted to engage with the ratchet gears 35a, 35b at the time of forward rotation for transmission of the driving force; and 131a, 131b, ratchet pawls fixed to the drivers also by means of pins 37 and adapted to engage with the ratchet gears 130a, 130b at the time of reverse rotation for transmission of the driving force. These ratchet pawls 36a, 36b and 131a, 131b are provided with springs 38, 132 and energized thereby to turn in the direction required for engagement with the ratchet gears, the springs being shown not in FIG. 1 but in FIGS. 4 through 6. The pawls 36a, 36b, 131a, 131b are arranged in pairs including a group of the first two and the other of the rest and, in every group, symmetrical with each other, however, no other than one pawl in every pair is shown in FIGS. 4 through 6. The numerals 135a, 135b indicate one-way clutches for forward movement composed of the ratchet gears 35a and ratchet pawl 36a, and of the ratchet gears 35b and ratchet pawl 36b, respectively, whereas 136a, 136b indicate another one-way clutches for backward movement composed of the ratchet gears 130a and ratchet pawl 131a, and of the ratchet gears 130b and ratchet pawl 131b, respectively.

The numerals 133a, 133b represent sliders slidably fitted onto the hub shaft 22; 40, restitution springs for the sliders 133a, 133b; and 41, a control lever for operating the sliders 133a, 133b. The sliders 133a and 133b are as long as corresponding to the pawls 36a, 131a, and 36b, 131b, respectively, and the slider 133a is provided with two diametrally large parts 133a' corresponding to a distance between the pawls 36a and 131a whereas the slider 133b with one diametrally large part 133b' corresponding to a distance between the pawls 36b and 131b.

The hub shaft 22 has a longitudinal bore 22c into which rods 42-1, 42-2 are inserted and, further, oblong holes 22a, 22b piercing through in the diametral direction at parts corresponding to tips of the rods 42-1, 42-2, wherein pins 43a, 43b to pierce through the sliders 133a, 133b in the diametral direction are inserted into the oblong holes 22a, 22b, respectively, and the tips of the rods 42-1, 42-2 are brought into contact with the pins 43a, 43b. A control lever 41 is fixed to the bracket 44 by means of a shaft 45 and the tip thereof abuts on the head of the rod 42-1, whereby, with the rods 42-1, 42-2 inwardly thrusted against the force of the restitution spring 40 by turning the control lever 41, the sliders 133a, 133b can be shifted within a range corresponding to lengths of oblong holes 22a, 22b. An intermediate collar 46 is fitted onto the middle portion of the hub shaft 22 for supporting inside faces of the drivers 13a, 13b and also preventing the pins 37 from slipping off.

The intermediate collar 46 may be formed to be integral with the hub shaft 22.

FIG. 1(a) shows a state in which the sliders 133a, 133b are shifted to the left (on the drawing) and the oneway clutch 135a, 135b for forward movement is turned on, the diametrally large parts 133a', 133b' of the sliders 133a, 133b being off the pawls 36a, 36b. Hence, the ratchet pawls 36a, 36b are engaged with the ratchet gears 35a, 35b as shown in FIG. 4(a) and, on the other hand, the pawls 131a, 131b are pushed from the rear ends so as to be tilted and disengaged from the ratchet gears 130a, 130b. In this way, the hub shell 11 rotates in the forward movement direction with the forward movement rotations of the drivers 13a, 13b to drive the wheelchair forwardly. Even when the drivers 13a, 13b are stopped or rotated in the backward movement direction, the hub shell 11 can rotate in the forward movement direction and permits smooth coasting of the wheelchair, drive on the wheelchair by the user's arm without treading pedals or wheeling by the attendant, of course. The pedal part 8 is of a structure in which pedals are reciprocated as will be described later and entirely free of trouble in reciprocation of pedals.

Figure 1B:
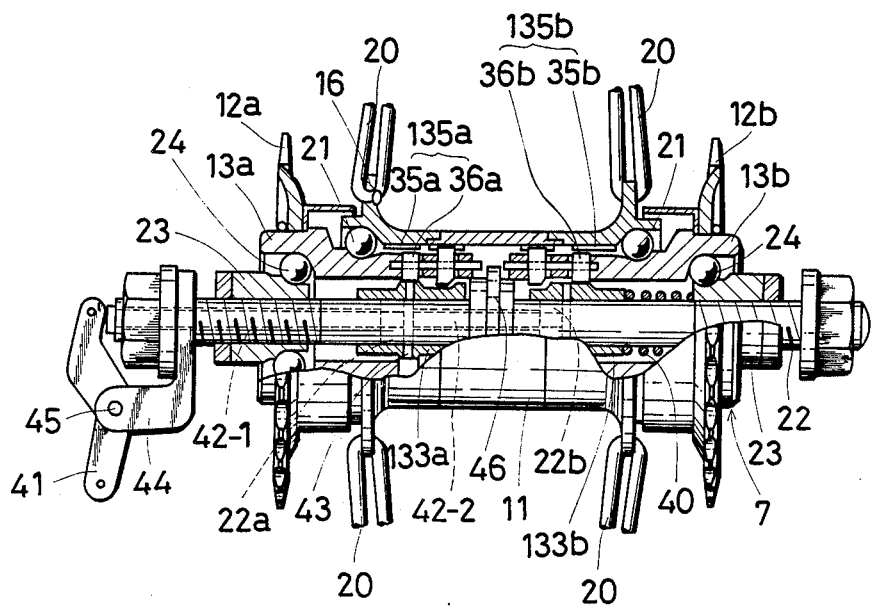

FIG. 1(b) shows a state in which the rods 42-1, 42-2 are pushed inward with the control lever 41 turned clockwise and the sliders 133a, 133b are positioned in the right extremity, thereby one-way clutches 136a, 136b for backward movement being turned on. That is to say, as shown in FIG. 5, the diametrally large parts 133a', 133b' are off the ratchet pawls 131a, 131b contrarily to those shown in FIG. 1(a) and the pawls 131a, 131b engage with the ratchet gears 130a, 130b. The hub shell 11, therefore, rotates in the reverse direction with reverse rotations of the drivers 13a, 13b so as to enable the backward movement of the wheelchair, to say nothing of backward coasting, drive by the user's arms without the use of pedals, and wheeling by the attendant.

Figure 10:
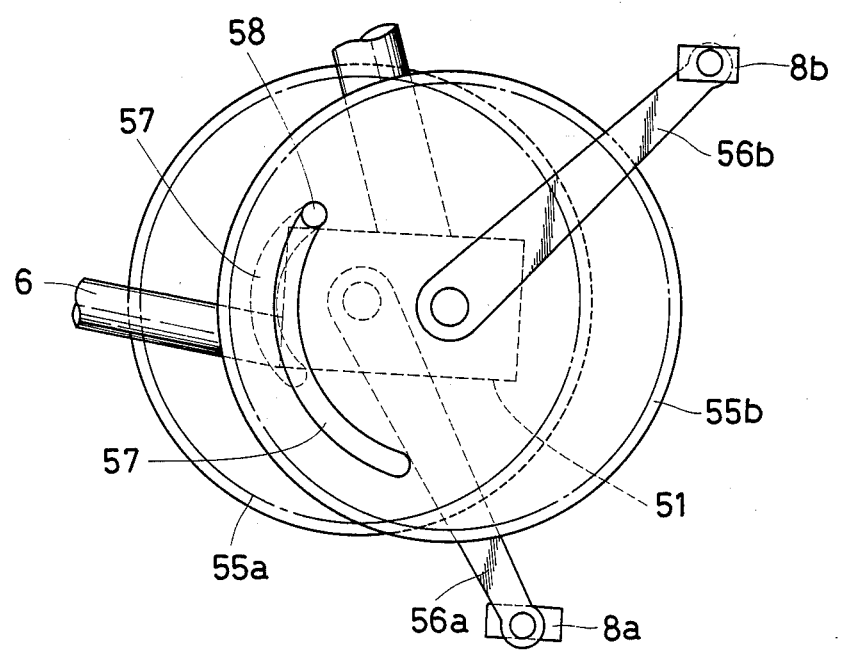
Figure 10B:
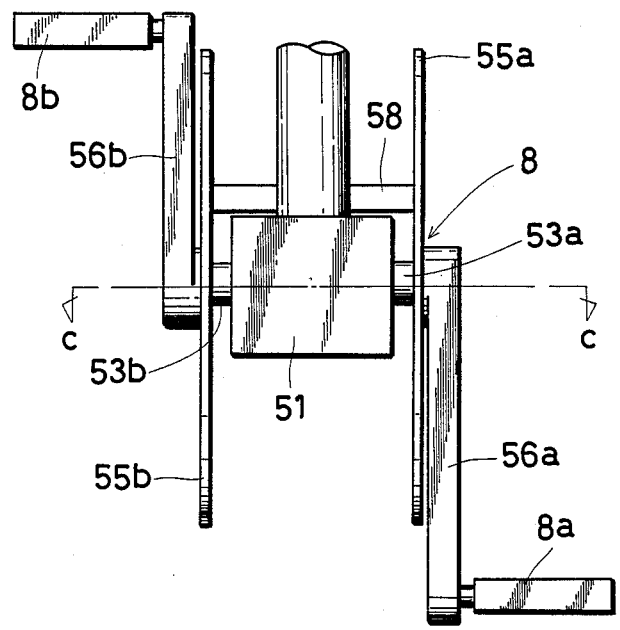
Figure 10C:
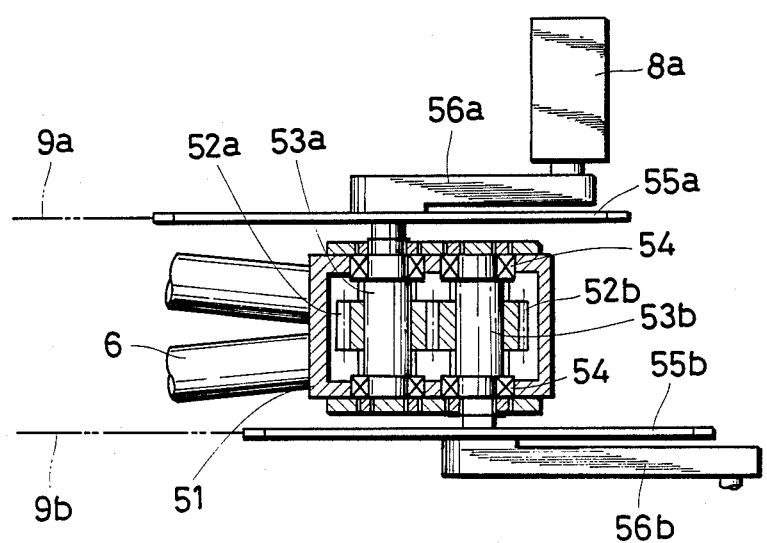

Meanwhile, in such a structure that the right and left pedals are interlocked to reciprocate in the opposite directions as in the embodiment shown in FIG. 10 that will be described later, when, for example, the one-way clutches 135a, 135b for the forward movement are turned on, reverse rotations of the right and left sprockets, if intended, are made impossible due to a state in which two pedals are liable to thrust each other while urged to move in the opposite directions, and, accordingly, the wheelchair can not move backward unless the structure is modified, thereby causing inconvenience. For eliminating inconvenience as above, in this embodiment, the hub shell 11 is put in the free state with all clutches released by means of sliders 133a, 133b so as to make possible the forward and backward movements without the use of pedals.

Figure 1C:
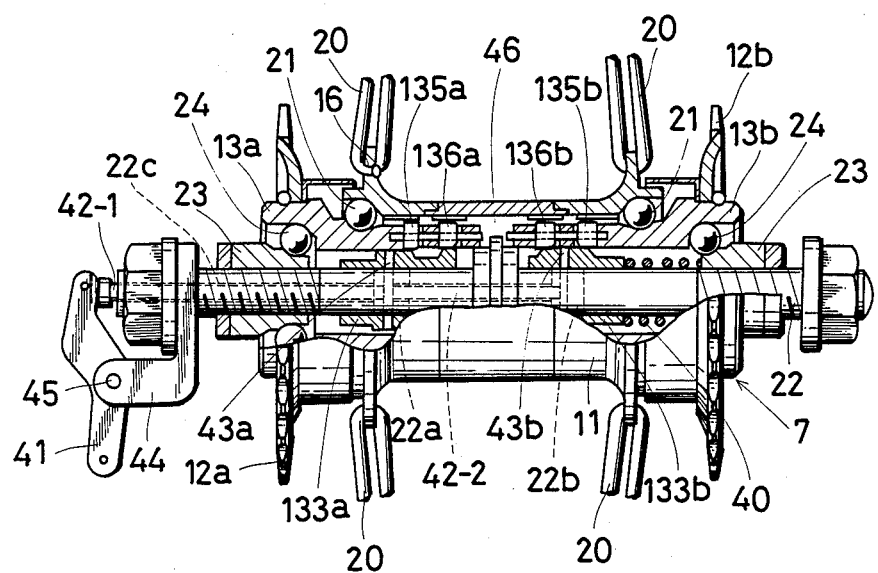
Figure 2:
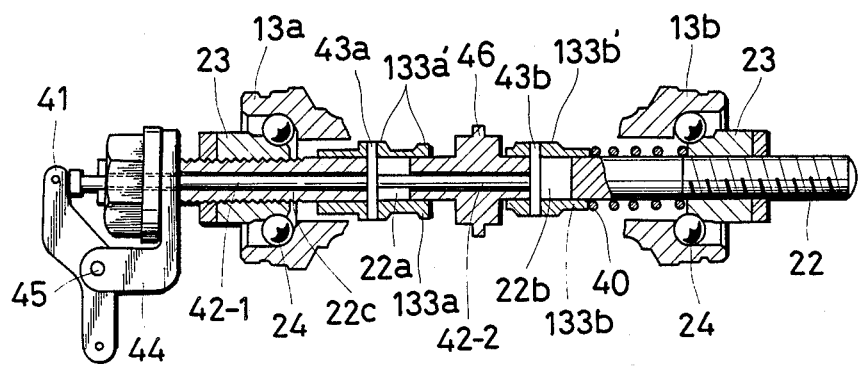
Figure 3:
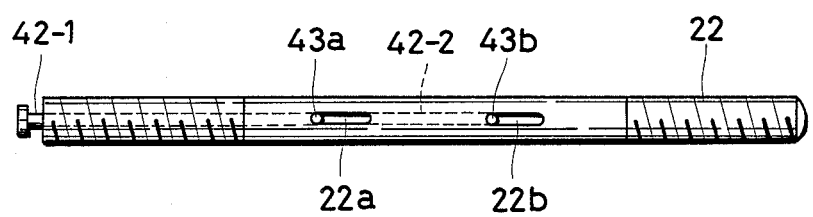

FIG. 1(c) shows the above-described state in which the rods 42-1, 42-2 are shifted to the mid-position and either one-way clutch for forward or backward movement is released. In other words, the sliders 133a, 133b are located in the mid-position and the diametrally large parts 133a', 133b' adapt all ratchet pawls to tilt for release from engagement with the ratchet gears. The hub shell 11, then, is made free to rotate while disengaged from the driving mechanism.

Figure 7:
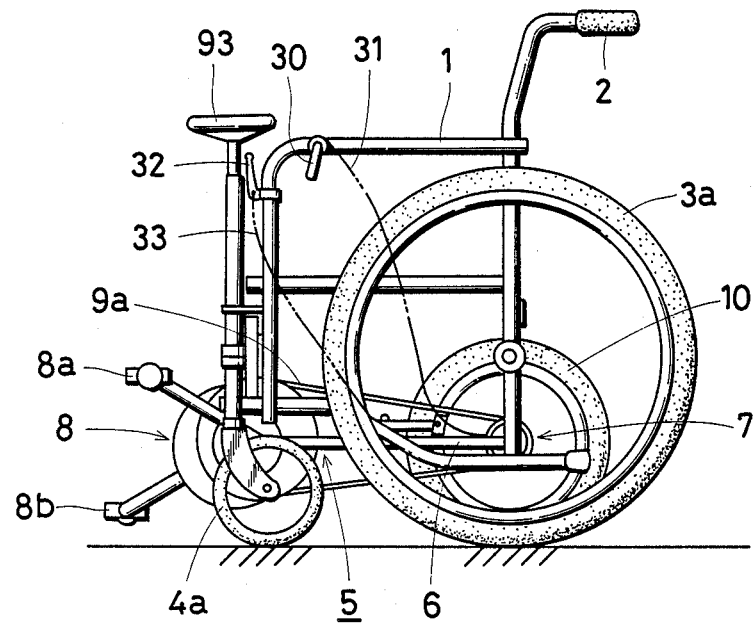
Figure 8:
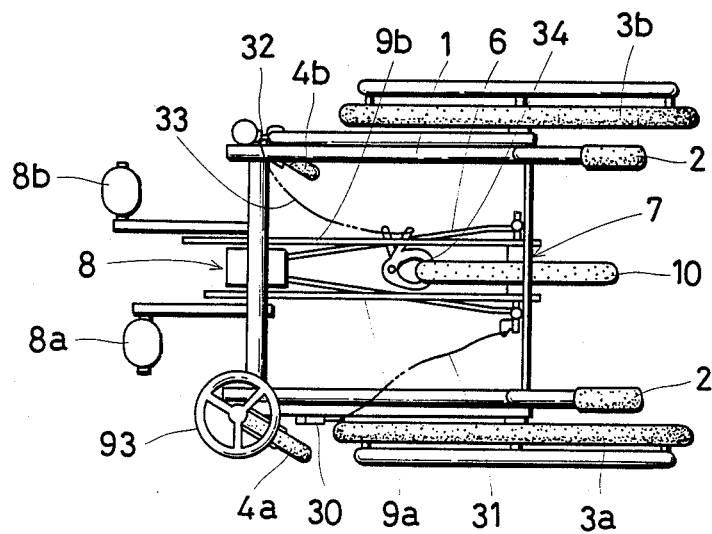
Figure 9:
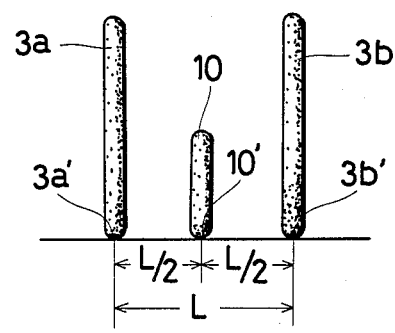

A clutch lever 30 shown in FIGS. 7 and 8 controls the turning angle of the control lever 41 for operational changeover between three kinds of states as forward movement, backward one, and free state, both levers 30 and 41 being connected with each other by a wire 31.

The surfaces of the diametrally large parts 133a40, 133b' of the sliders 133a, 133b to be in contact with the ratchet pawls 36a, 36b and 131a, 131b are tapered for enabling smooth shift of the sliders 133a, 133b.

The reference numeral 32 in FIGS. 7 and 8 designates a brake lever and a brake 34 to be operated through the wire 33 is provided for the driving wheel 10. In the brake mechanism as above, an ordinary type brake for the bicycle can be used and is disposed independently of the other brake mechanism (not shown) generally provided for the wheelchair to press the tires of the main wheels thereof.

An example of pedal part 8 as a driving force generating source shown in FIG. 10 will be described below.

The numeral 51 indicates an enclosed type gear box provided in the lower front of the main frame 1 (not shown) and incorporating: two spur gears 52a, 52b meshing with each other; crank shafts 53a, 53b mounted with gears 52a, 52b and individually projecting right and left while supported by bearings 54 at both sides of the gear box 51; sprockets 55a, 55b and cranks 56a, 56b fixed to the projecting tips of the crank shafts 53a, 53b; and pedals 8a, 8b fixed to the tips of the cranks 56a, 56b, respectively. Arcuate long holes 57 are formed each on the mid-portion between the bottom of the tooth and the center of each of sprockets 55a, 55b, and each combination of the arcuate hole with the stopper pin 58 projecting from the gear box 51 enables each of cranks 56a, 56b to turn within a range including the longitudinal direction, driving chains 9a, 9b being extended between the sprockets 55a, 55b and those 12a, 12b of the above-described hub part 7, respectively.

In the pedal part 8 of such a structure as above, one pedal rises upward when the other is trodden downward and, with these pedals alternately trodden, driving force generated therefrom is transmitted to the hub part 7 through the chains 9a, 9b, whereby the drivers 13a, 13b of the hub part are driven alternately in the forward and backward movement directions to rotate the hub shell 11 or the driving wheel 10 and to render the wheelchair to move forward or backward correspondingly to the clutch lever 30 operated. At this time, the pedals 8a, 8b reciprocating within an angular range including a direction perpendicular to the treading direction, namely, the horizontal direction, ensure efficient and constant convertion of treading force into driving force. A range of motion of the user's legs is smaller than that formed by circular loci produced generally by pedals of the bicycle, and simple alternate treading of pedals not arousing the user's consciousness of rotation of pedals enables sufficient drive of the wheelchair by those who are obliged to use the wheelchair due to feeble legs thereof.

Figure 11:
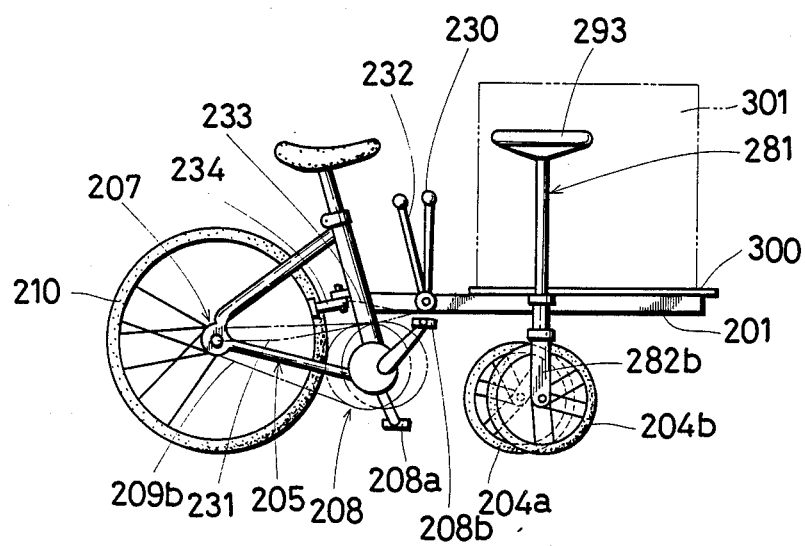
FIGS. 11 and 12 are views of a second embodiment, in which a conveyor cart provided with a hub mechanism of this invention is shown.
Figure 12:
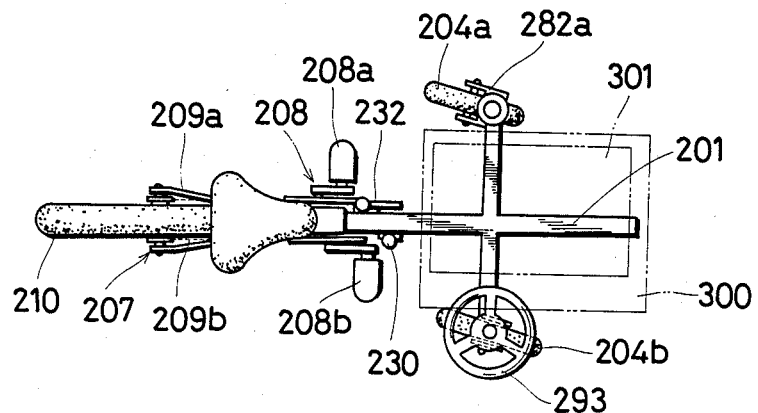

FIGS. 11 and 12 show an embodiment of the bicycle type conveyor cart having two front wheels.

One of direction-changeable wheels 204a, 204b provided on both sides of the main frame 201 is a free foot wheel carried by a retainer frame 282a whose rotational center is eccentric with respect to the axis of the foot wheel where as the other is a steering wheel carried by a retainer frame 282b whose rotational center is not eccentric, the latter wheel 204b being connected with a steering handle 293.

A driving wheel 210 is provided in the rear of the main frame 201 and a driving mechanism 205 for self-propelling to drive the driving wheel 210 is composed of a hub part 207, pedal part 208, and so on. The hub part 207 used on this embodiment is in the same structure as that of the hub part 7 described with reference to FIGS. 1 through 6, and the pedal part 208 is also structurally identical to the pedal part 8 described referring to FIG. 10, the treading force applied to the pedals 208a, 208b being transmitted to the hub part 207 through the chains 209a, 209b, respectively. The numeral 230 denotes a clutch lever for applying clutch operation to the hub part 7 through a wire 231, the numeral 232 denoting a brake lever for operating a brake 234 through a wire 233.

The vehicle embodying this invention in such a structure as above is driven by the user who treads pedals while putting a load 301 on the carrier 300. Changeover between forward movement, backward one, and free state can optionally be performed by operating the clutch lever 230 and, upon change of the direction of the steering wheel 204b with the steering handle 293 operated, the direction of the free foot wheel 204a following the motion of the steering wheel is changed to be the same as that of the steering wheel, whereby the vehicle can move in any direction as desired.

What is claimed is:

1. A hub mechanism for a self-propelling type light vehicle provided with:

a hub shaft secured to a main body of the vehicle;

a pair of right and left drivers rotatably carried by said hub shaft and independently rotatable in the directions for forward and backward movements of the vehicle when actuated by the driving force transmitted from a driving force generating source;

a hub shell rotatably carried by said drivers;

a pair of right and left one-way clutches for forward movement to transmit rotations of said drivers in the forward movement direction to said hub shell respectively and another pair of right and left one-way clutches for backward movement to transmit rotations of said drivers in the backward movement direction to said hub shell respectively, the one-way clutches each being composed of ratchet gears formed on the inner periphery of the hub shell and of at least a ratchet pawl provided for the driver; and releasing members to release the rotation transmitting actions of said one-way clutches for forward and backward movement individually or collectively, said releasing members for releasing the rotation-transmitting action of the one-way clutches being sliders slidably fitted onto the hub shaft and a control over the position of the sliders adapts diametrally large parts formed on the outer periphery of the sliders to tilt the ratchet pawl selectively releasing engagement between the ratchet pawl and the ratchet gear.

2. A hub mechanism for the self-propelling type light vehicle as set forth in claim 1, wherein the driving force generating part is composed of a pair of right and left pedals repeating reciprocation and is in such a structure that the treading force applied to one pedal is transmitted independently of that applied to the other pedal through a pair of right and left connecting members respectively.

3. A hub mechanism for the self-propelling type light vehicle as set forth in claim 2, wherein, the pair of right and left pedals repeating reciprocation are interlocked to move in the directions opposite to each other so that a driver on one side rotates in the direction for forward movement of the vehicle while the other on another side rotates for backward movement.

* * * * *